US012576796B2

(12) United States Patent
Teufel

(10) Patent No.: US 12,576,796 B2
(45) Date of Patent: Mar. 17, 2026

(54) DEVICE FOR ADJUSTING A DISPLAY ARRANGEMENT FOR A VEHICLE ROOF AND VEHICLE ROOF FOR A MOTOR VEHICLE

(71) Applicant: Webasto SE, Stockdorf (DE)

(72) Inventor: Ingo Teufel, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/754,437

(22) Filed: Jun. 26, 2024

(65) Prior Publication Data

US 2025/0026281 A1     Jan. 23, 2025

(30) Foreign Application Priority Data

Jul. 17, 2023     (DE) ..................... 10 2023 118 830.5

(51) Int. Cl.
B60R 11/02          (2006.01)
B60K 35/21          (2024.01)
(Continued)

(52) U.S. Cl.
CPC .......... B60R 11/0235 (2013.01); B60K 35/21 (2024.01); B60K 35/60 (2024.01);
(Continued)

(58) Field of Classification Search
CPC ......... B60R 11/0235; B60R 2011/0028; B60R 2011/0084; B60R 2011/0085;
(Continued)

(56) References Cited

U.S. PATENT DOCUMENTS 6,682,134 B2 *    1/2004   De Gaillard ........... B60J 7/0435
                                                        296/216.03
10,857,860 B2 *   12/2020  Janssen .................. B60J 7/0435
                        (Continued)

FOREIGN PATENT DOCUMENTS

DE        102019124081 B3 *   2/2021    ......... B60R 11/0229
DE        102020103049 A1 *   8/2021    ............ B60J 7/0435
                        (Continued)

OTHER PUBLICATIONS

Office Action issued against corresponding German Application No. 10 2023 118 830.5; mailed May 15, 2024; In German with English Machine Translation (10 pages).

*Primary Examiner* — Terrell L Mckinnon
*Assistant Examiner* — Ding Y Tan
(74) *Attorney, Agent, or Firm* — Fitch, Even, Tabin & Flannery, LLP

(57)          ABSTRACT
A device for adjusting a display arrangement for a vehicle roof includes a lever mechanism for pivoting open and in, and for moving the display arrangement with movable guide sliders and pivot levers which are coupled to one another, a spring element with two spring arms, a fixed spring guide element with a guide portion and a first end stop, wherein an end portion of the first spring arm engages in the guide portion and can be moved inside the guide portion along the guide rail, and a rotatably mounted locking element which is coupled to the second guide slider. The locking element can be transferred by means of the first guide slider and the spring element from a first state in which the display arrangement is folded in and locked, into a second state in which the display arrangement is unlocked and can be pivoted open or pivoted in.

14 Claims, 18 Drawing Sheets

(51) Int. Cl.
*B60K 35/60* (2024.01)
*B60R 11/00* (2006.01)

(52) U.S. Cl.
CPC . *B60K 2360/771* (2024.01); *B60R 2011/0028* (2013.01); *B60R 2011/0084* (2013.01); *B60R 2011/0085* (2013.01); *B60R 2011/0276* (2013.01)

(58) Field of Classification Search
CPC . B60R 2011/0276; B60K 35/60; B60K 35/21; B60K 2360/771
See application file for complete search history.

(56) References Cited

U.S. PATENT DOCUMENTS

| | | | | |
|---|---|---|---|---|
| 11,358,450 B2 * | 6/2022 | Eger | ..................... | B60J 7/0435 |
| 2021/0070233 A1 | 3/2021 | Podolski | | |
| 2024/0190250 A1 * | 6/2024 | Nellen | .................. | B60K 35/53 |

FOREIGN PATENT DOCUMENTS

| | | | | | |
|---|---|---|---|---|---|
| DE | 102022112219 B3 | | 6/2023 | | |
| DE | 102022109666 B3 * | | 7/2023 | ......... | B60R 11/0235 |
| EP | 3708432 A2 * | | 9/2020 | ......... | B60R 11/0235 |
| WO | WO-2023202911 A1 * | | 10/2023 | ......... | B60R 11/0235 |

* cited by examiner

FIG 17

DEVICE FOR ADJUSTING A DISPLAY ARRANGEMENT FOR A VEHICLE ROOF AND VEHICLE ROOF FOR A MOTOR VEHICLE

CROSS-REFERENCE TO RELATED APPLICATION(S)

This application claims the benefit of German Patent Application No. 102023118830.5 filed Jul. 17, 2023, which is incorporated herein by reference in its entirety.

TECHNICAL FIELD

The invention relates to a device for adjusting a display arrangement for a vehicle roof. The invention further relates to a vehicle roof for a motor vehicle having such a device.

BACKGROUND

Some motor vehicles have a display arrangement which can provide an entertainment program, as desired, and contributes to greater comfort in the motor vehicle. In some cases, such a display arrangement is provided with a kinematic design which enables the display arrangement to be folded in and folded out as required. One challenge is to enable a space-saving and cost-effective arrangement of such an electronic entertainment system.

SUMMARY

The object of the invention is to provide a device for adjusting a display arrangement for a vehicle roof which permits a reliable and secure configuration of a desired adjustment of the display arrangement and which can also contribute to a cost-effective and comfortable motor vehicle.

The object is achieved by the features of the independent claims. Advantageous embodiments are specified in the dependent claims.

A device according to the invention for adjusting a display arrangement for a vehicle roof comprises a lever mechanism which can be coupled to a display holder of the display arrangement and which is configured for pivoting open and for pivoting in and for moving the display arrangement, wherein the lever mechanism comprises a first guide slider and a second guide slider which can be moved along a guide rail by means of a drive unit. The lever mechanism also comprises a first pivot lever and a second pivot lever which are coupled to one another, so as to be pivotable about one respective pivot axis, and to the guide sliders.

The guide rail can be regarded as a component of the device or of the vehicle roof or form a separate component. The device is designed for the use thereof on and/or in the guide rail. The same applies to the display arrangement which comprises a display and a display holder. The display arrangement can be regarded as a component of the device or of the vehicle roof or form a separate component. The device is designed for the use thereof in cooperation with the display arrangement.

The device further comprises a spring element and a spring guide element. The spring element comprises a first spring arm and a second spring arm and is coupled to the second guide slider and to the second pivot lever. The spring guide element is fixedly arranged relative to the guide rail or the vehicle roof and comprises a guide portion with at least one first end stop. The guide portion is configured to be adapted to an end portion of the first spring arm, so that the end portion of the first spring arm engages in the guide portion and can be moved inside the guide portion along the guide rail in a predetermined manner.

The device also comprises a locking element which is coupled to the second guide slider and is mounted to be rotatable about a pivot axis. The locking element can be transferred by means of the first guide slider and the spring element from a first state in which the display arrangement is folded in and locked, into a second state in which the display arrangement is unlocked and can be pivoted open or pivoted in. In the unlocked second state, the two guide sliders can be moved relative to one another and, as a result, a spacing between the two guide sliders can be adjusted in a predetermined manner and a pivoting open and pivoting in of the display arrangement can be adjusted in a predetermined manner by means of the two pivot levers.

The described device enables a comfortable and reliable adjustment of a desired position and orientation of a display arrangement which can also be implemented cost-effectively and integrated in a space-saving manner in the structure of a vehicle roof for a motor vehicle. The device produces an electrically actuatable mechanism which simply requires a drive unit for activating the two guide sliders and for pivoting and moving the display arrangement. Thus, the device can be implemented by a particularly manageable and space-saving structure with a small number of components and permit a comfortable lowering in the downward direction as well as an orientation and adjustment of a display in a vehicle interior.

In the context of this description, terms such as "top", "bottom", "front", "rear", "left", "right" and "vertical" and "horizontal" denote directional information or orientations which refer to an operational use of the device in a motor vehicle which is ready for use. The described display arrangement, which can be lowered and oriented as required by means of the described device, is provided in particular for vehicle occupants on the rear seat bench. Thus, a horizontal movement component refers to a plane which is substantially parallel to the vehicle roof. A vertical orientation thus takes place in a plane which runs substantially perpendicularly to the horizontal plane or the vehicle roof. The vehicle front is arranged at the front and the vehicle rear is arranged at the rear.

According to one development of the device, the spring element on the first spring arm has a hook-shaped end portion which engages in a guide recess of the spring guide element. The guide recess can be designed as a channel or slot. Relative to the longitudinal axis of the vehicle roof and the freedom of movement which is provided of the spring arm, the guide recess can be open on both sides, closed on both sides, or open or closed on one side. The guide recess can also be open at the top and/or at the bottom, so that at least one access is provided for the end portion of the first spring arm and a reliable and controlled guidance of the first spring arm is provided.

According to a further development of the device, the guide recess is defined in a U-shaped manner, for example by the guide recess being defined laterally by the side walls of the spring guide element and on the longitudinal side by the first end stop. The guide recess can thus be open on one side and provide a predetermined guide channel for the first spring arm. The first end stop thus represents a controlled end of movement of the first spring arm and the second guide slider, and permits a simple and reliable unlocking and locking of the display arrangement. The second guide slider is coupled to the spring element and is movable in a predetermined manner until the first spring arm strikes against the first end stop. Then a further mobility of the second guide slider is intentionally blocked in this direction along the guide rail or the longitudinal axis, so that the second guide slider now forms a type of fixed bearing inside the guide rail, which the first guide slider can approach for pivoting open the display arrangement. Accordingly, the first guide slider is moved away from the fixed second guide slider when the display arrangement is pivoted in.

According to a further development of the device, the spring guide element comprises a further second end stop so that the two end stops define the guide recess on opposing sides and limit a mobility of the first spring arm along a longitudinal axis of the vehicle roof in a predetermined manner.

According to a further development of the device, the first spring arm contacts the first end stop in the first state of the display arrangement and/or contacts the second end stop in the second state of the display arrangement. The end stops thus represent a controlled end of movement of the first spring arm and thus of the second guide slider.

According to a further development of the device, the guide recess of the spring guide element and the locking element are configured to be adapted to one another in terms of geometry. The guide recess can form, for example, a type of upwardly open pocket which permits a predetermined mobility of the first spring arm and the second guide slider coupled thereto. This mobility is adapted, in particular, relative to the shape of the locking element so that a reliable movement and/or rotation of the locking element can be implemented by means of the driving first guide slider and the second guide slider coupled thereto, until the display arrangement is unlocked or locked.

According to a further development of the device, the spring guide element comprises a fastening element, the spring guide element being able to be fixedly attached thereby to the guide rail. This can be designed, for example, in the form of a bolt or a screw.

According to a further development of the device, the spring guide element comprises a support element which supports the first spring arm. The support element can be designed, in particular, such that it is in direct contact with the first spring arm, for example on a lower face, in the region of the end portion, and thereby provides a particularly secure and reliable support.

According to a further development of the device, the second spring arm is coupled to the second pivot lever, so that it exerts a force on the second pivot lever which drives it in a direction in order to form the first state of the display arrangement. The first spring arm can provide a counter-weight or a counterforce to the second spring arm, in particular in connection with the above-described support element. The second spring arm engages, for example, in a dedicated opening of the second pivot lever or engages below the second pivot lever and thereby permits a particularly gentle lowering of the display arrangement, since its spring force counteracts the weight force of the display arrangement. The two spring arms can be coupled together, in particular by windings, which for example are wound around a pin on the second guide slider and provide a desired freedom of movement of the second spring arm for lowering the display arrangement. In this manner, the spring element represents a resilient compensation element which introduces coupling and resilient properties into the device in a targeted manner.

According to a further development of the device, the locking element has a locking arm which is configured to be adapted to a locking receiver so that in the first state the locking arm is arranged outside the locking receiver and in the second state the locking arm is arranged inside the locking receiver.

According to a further development, the device is configured relative to a ready-for-operation state on the vehicle roof, such that starting from the first state of the display arrangement the locking element with the locking arm can be driven by means of the first guide slider and the spring element along a longitudinal axis of the vehicle roof and can be moved in the direction of a lower face of the vehicle roof until the locking arm engages in the locking receiver and, as a result, the second state of the display arrangement can be formed, in which the display arrangement can be lowered by means of further movement of the first guide slider.

According to a further development, the device comprises the guide rail, the device being able to be coupled thereby to a roof body of the vehicle roof, wherein the guide rail has an opening which forms the locking receiver. Thus the locking element can be configured such that it cooperates with the guide rail. The guide rail can also have an end stop element against which the first guide slider moves when the display is folded in and locked, and thus specifies a reliable and secure end position or park position of the display arrangement. Such an end stop element can be represented by a type of button which confirms that the locked position has been reached and prevents further movement of the display arrangement.

The described options for the embodiment of the device permit in each case a gentle and quiet lowering and rotation of the display arrangement in a motor vehicle. The structure of the device with a small number of components is manageable and cost-effective and since switching processes, which are associated with noise, are not required, a reliable and secure orientation of the display arrangement in a vehicle interior can be implemented with a single electric drive. A separate switching element is not required for unlocking. Thus, it is not necessary to move locking components out of pockets or openings and to re-engage them elsewhere. The spring element, which is mounted so as to be guidable in a slotted rail, serves as an unlocking element and at the predetermined position pushes gently against the locking element and opens the locking hook.

In the first state, the display is in a park position and, for example, stowed substantially parallel to the vehicle roof in a rear region above the head region of the vehicle occupants. When the display is folded out, it is initially moved slightly to the front and, as a result, the locking is opened and the display is transferred into the second rotatable state. A spacing between the two guide sliders can now be reduced in a predetermined manner, so that the pivot levers can rotate in a predetermined manner about their respective pivot axes and release the display or a lower edge of the display downwardly into the vehicle interior.

In cooperation with the pivot levers it is possible to adjust, for example, an orientation angle of the display of 65°-85° in the direction of the vehicle interior. Such an orientation angle refers to the angle between a main extension plane of the display and a horizontal plane or a park position in which the display is folded in. Alternatively, the orientation angle can refer to the angle which is enclosed between the main extension plane of the display and a vertical plane. Accordingly, it might be possible to adjust an orientation angle of 5°-25°. An adjustment of the orientation angle takes place continuously, in particular, but can also be provided in predetermined steps. Thus, the pivoting out or pivoting in of the display can be stopped, for example, even at intermediate positions of 30°, 40°, 50° or 60°. Moreover, the device can also be designed to permit other angular ranges for adjusting the display of the display arrangement.

The lever mechanism or the first guide slider is coupled, for example, by a drive cable to an electric motor. The translational and rotational movement of the display or the display arrangement can be implemented simply by this one drive unit. Thus, the display arrangement can be pivoted in and pivoted out and moved in a controlled and reliable manner in order to form a pivoted or lifted position of the display arrangement and to adjust a desired angular orientation.

The described device can be implemented in a manageable, cost-effective and space-saving manner, so that an installation space requirement in a vehicle interior can be kept small. The device can be integrated, in particular, in a vehicle roof or arranged on such a vehicle roof and still permit a comfortable freedom of movement of the head in the vehicle interior. In this manner, a controlled movement and blocking of the display arrangement can be provided without switching processes which are associated with noise, and can contribute to the possibility of high-quality entertainment in a motor vehicle.

A vehicle roof according to the invention comprises two guide rails which are arranged relative to a longitudinal axis of the vehicle roof on opposing sides of the vehicle roof, and an embodiment of the above-described device for adjusting a display arrangement which is coupled to the vehicle roof by means of the guide rails. The device can use, in particular, existing spaces which are located inside one respective guide rail and which are also configured, for example, for operating a shading device. In particular, the first and second lever mechanism can be arranged inside a common guide rail so that the lever mechanisms share a common guide rail.

Relative to a vehicle roof, the device can comprise, in particular, a duplicated number of the described components or two devices are provided, the two devices being configured and arranged substantially mirror-symmetrically relative to a central or middle longitudinal axis of the vehicle roof. The vehicle roof with the described device thus contributes to greater comfort of a motor vehicle and can be produced more cost-effectively in comparison with conventional tilting devices for a display. As the vehicle roof comprises an embodiment of the above-described device, the above-described features and properties of the device are also disclosed for the vehicle roof and vice-versa.

BRIEF DESCRIPTION OF DRAWINGS

Exemplary embodiments of the invention are described in more detail hereinafter with reference to the schematic drawings, in which:

FIGS. 4-21 show different states of the device according to FIGS. 2-3 in different views.

DETAILED DESCRIPTION

Elements having the same construction or function are identified in all of the figures with the same reference signs. For reasons of clarity, in some cases not all of the elements shown are identified with reference signs in all of the figures.

Figure 1:
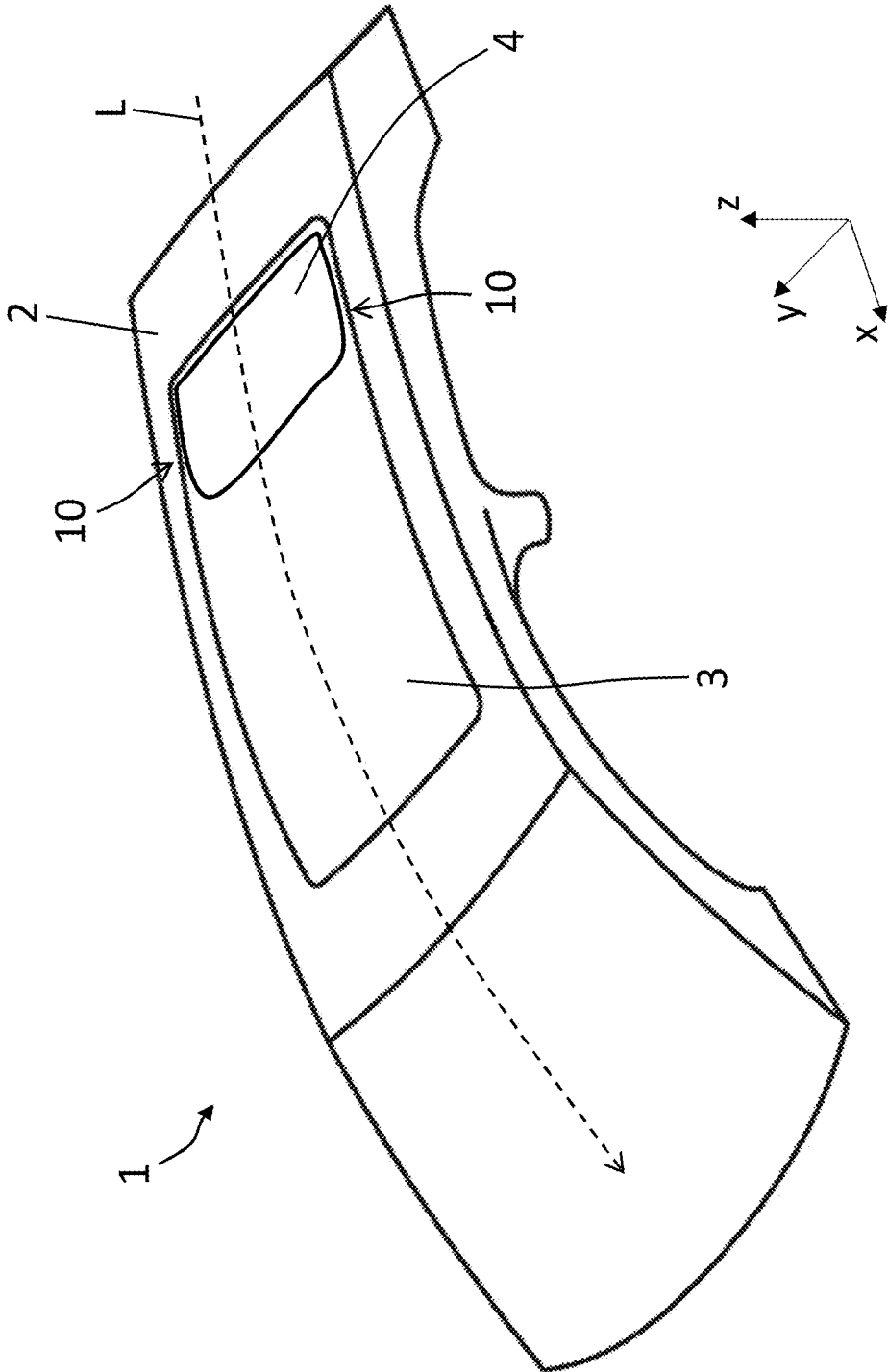
FIG. 1 shows a vehicle roof for a motor vehicle in a perspective view.

FIG. 1 shows schematically in a perspective view a vehicle roof 1 for a motor vehicle which has a cover 3 and a display arrangement 4. The cover 3 is, for example, a fixed glass element which is immovable relative to the vehicle roof 1. Alternatively, the cover 3 is movable relative to the vehicle roof 1 in order to open up and to close selectively an opening in the vehicle roof 1. The vehicle roof 1 can also not have a cover 3 and can be a roof skin 2, without an opening, of a fixed roof or a convertible roof which can be folded or folded up and which can be stowed in a rear region of the motor vehicle. Moreover, the vehicle roof 1 can also form a convertible roof with the cover 3, wherein the cover 3 is designed such that it can be folded together or folded up.

The vehicle roof 1 further comprises two devices 10 which are arranged relative to a direction of travel or longitudinal axis L of the vehicle roof 1 on opposing sides of the vehicle roof 1. The devices 10 are constructed and arranged mirror-symmetrically relative to the longitudinal axis L so that only one device 10 is detailed hereinafter. As explained in more detail with reference to the following FIGS. 2-21, with a manageable and space-saving structure the device 10 permits a reliable and secure configuration of a desired adjustment of the display arrangement 4 and contributes to a cost-effective and comfortable motor vehicle.

In the context of this description terms such as "top", "bottom", "front", "rear", "left", "right" and "vertical" and "horizontal" denote directional information, orientations or positions which refer to an operational use of the device 10 in a motor vehicle which is ready for operation. The illustrated longitudinal axis L also has an arrow symbol which indicates a conventional direction of travel for improved orientation. The described display arrangement 4 is provided, in particular, for vehicle occupants on the rear seat bench and can be lowered and oriented simply and comfortably by means of the described device 10 as required.

Figure 2:
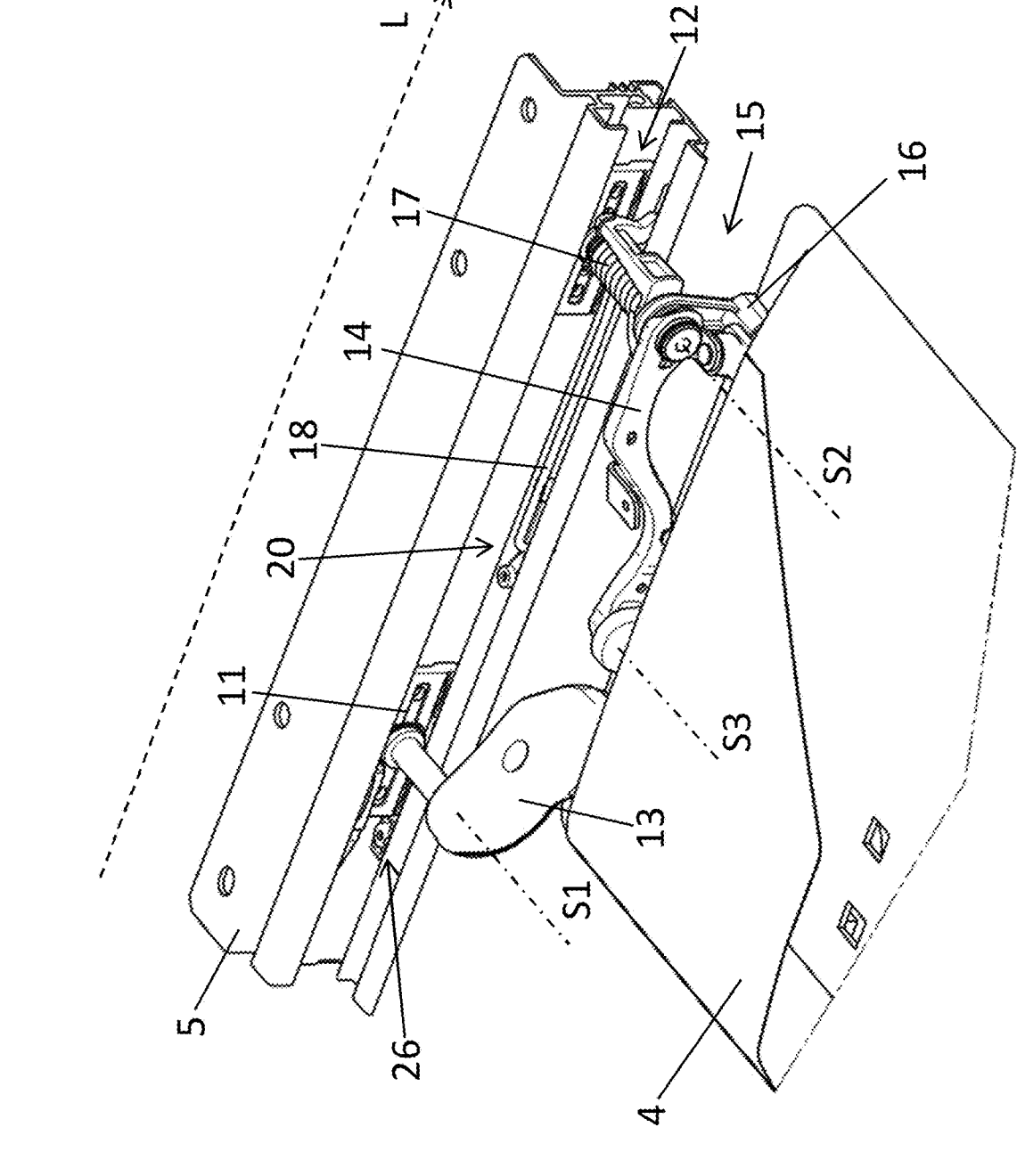
FIGS. 2-3 show an embodiment of a device for adjusting a display arrangement for the vehicle roof according to FIG. 1 each in a perspective view.
Figure 3:
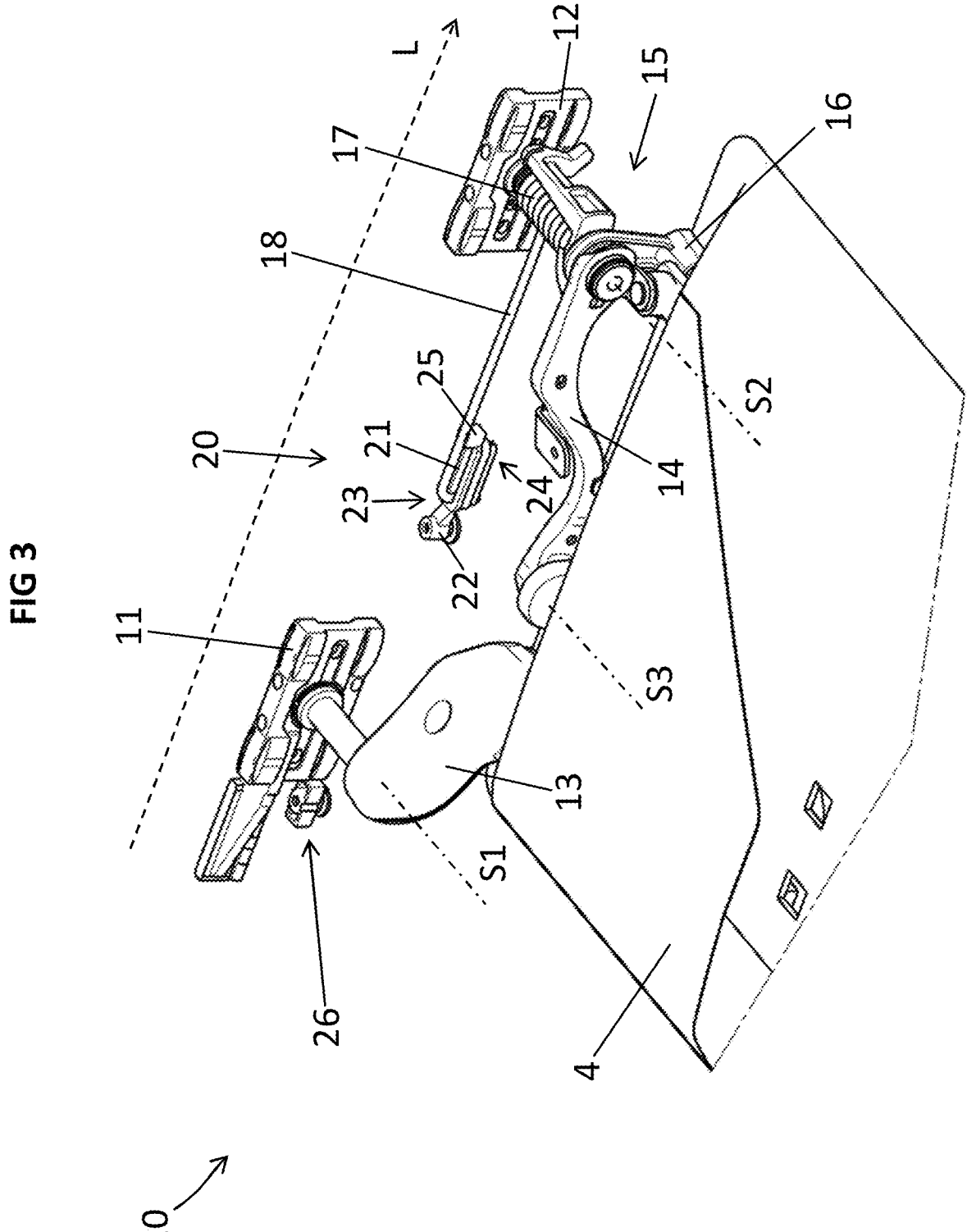

FIGS. 2 and 3 show the device 10 in one respective perspective view with (FIG. 2) and without (FIG. 3) the guide rail 5.

The device 10 for adjusting the display arrangement 4 on the vehicle roof 1 comprises a lever mechanism which is coupled to a display holder of the display arrangement 4 and which is configured for pivoting open and pivoting in and for moving the display arrangement 4. The lever mechanism comprises a first guide slider 11 and a second guide slider 12 which can be moved along a guide rail 5 by means of a drive unit. The lever mechanism also comprises a first pivot lever 13 and a second pivot lever 14 which are coupled together, so as to be pivotable about one respective pivot axis S1, S2, S3, and to the guide sliders 11, 12.

The device 10 further comprises a spring element 17 which comprises a first spring arm 18 and a second spring arm 19 and which is wound around a pin and coupled to the second guide slider 12. The device 10 further comprises a spring guide element 20 which is coupled to the guide rail 5 and fixedly arranged thereon by means of a fastening element 22 and which comprises a guide portion with an elongated guide recess 21. The guide recess 21 is defined along the longitudinal axis L on both sides by a first and a second end stop 23 and 24 and provides a predetermined freedom of movement of the spring element 17 and the second guide slider 12 coupled thereto. The guide recess 21 has substantially an elongated annular shape and is configured to be adapted to a hook-shaped end portion 181 of the first spring arm 18. The end portion 181 of the first spring arm 18 engages in the guide recess 21 and can be moved inside the guide recess 21 along the guide rail 5 in a predetermined manner.

The device 10 further comprises a locking element 15 with a locking arm 151 and a locking hook 16. The locking element 15 is coupled to the second guide slider 12 and is mounted to be rotatable about the pivot axis S2. The locking element 15 can be transferred by means of the first guide slider 11 and the pivot levers 13, 14 coupled thereto and, as a result, by means of the spring element 17 from a first state in which the display arrangement 4 is folded in and locked, into a second state in which the display arrangement 4 is unlocked and can be pivoted open or pivoted in. Thus, in the unlocked second state the two guide sliders 11, 12 can be moved relative to one another and a spacing between the two guide sliders 11, 12 can be changed, and a pivoting open and pivoting in and orientation of the display arrangement 4 can be adjusted in a predetermined manner by means of the two pivot levers 13, 14.

The first spring arm 18 is mounted so as to be moveable inside the guide rail 5. The hook-shaped end portion 181 of the first spring arm 18 engages in the guide recess 21 and can be moved therein between the end stops 23, 24. The second spring arm 19 is coupled to the second pivot lever 14 and exerts a force on the second pivot lever 14, which drives it upwardly in a direction for forming the first state of the display arrangement 4. The first spring arm 18 is supported from below by a support element 25 of the spring guide element 20 in the region of the end portion 181 and forms a counterweight or a counterforce to the second spring arm 19. The second spring arm 19 engages below the second pivot lever 14 and permits a particularly gentle lowering of the display arrangement 4, since its spring force counteracts the weight force of the display arrangement 4. The two spring arms 18 and 19 are coupled together by means of windings which are wound around the pin on the second guide slider 12 and provide a desired freedom of movement of the second spring arm 19 for lowering the display arrangement 4. In this manner, the spring element 17 represents a resilient compensation element which introduces coupling and resilient properties into the device 10 in a targeted manner.

Moreover, an end stop element 26 is introduced inside the guide rail 5, the first guide slider 11 moving thereagainst when the display is folded in and locked, and thus specifying a reliable and secure end position or park position of the display arrangement 4. The end stop element 26 can represent a type of button which confirms when the locked position has been reached and intentionally prevents a further movement of the display arrangement 4.

FIGS. 4-21 show different positions of the display arrangement 4 in various views. In each case a left-hand view, a right-hand view and a cross section along a vertical plane perpendicular to the longitudinal axis L for the respectively shown adjusted positions of the display arrangement 4 are shown in FIGS. 4-21.

Figures 4, 5:
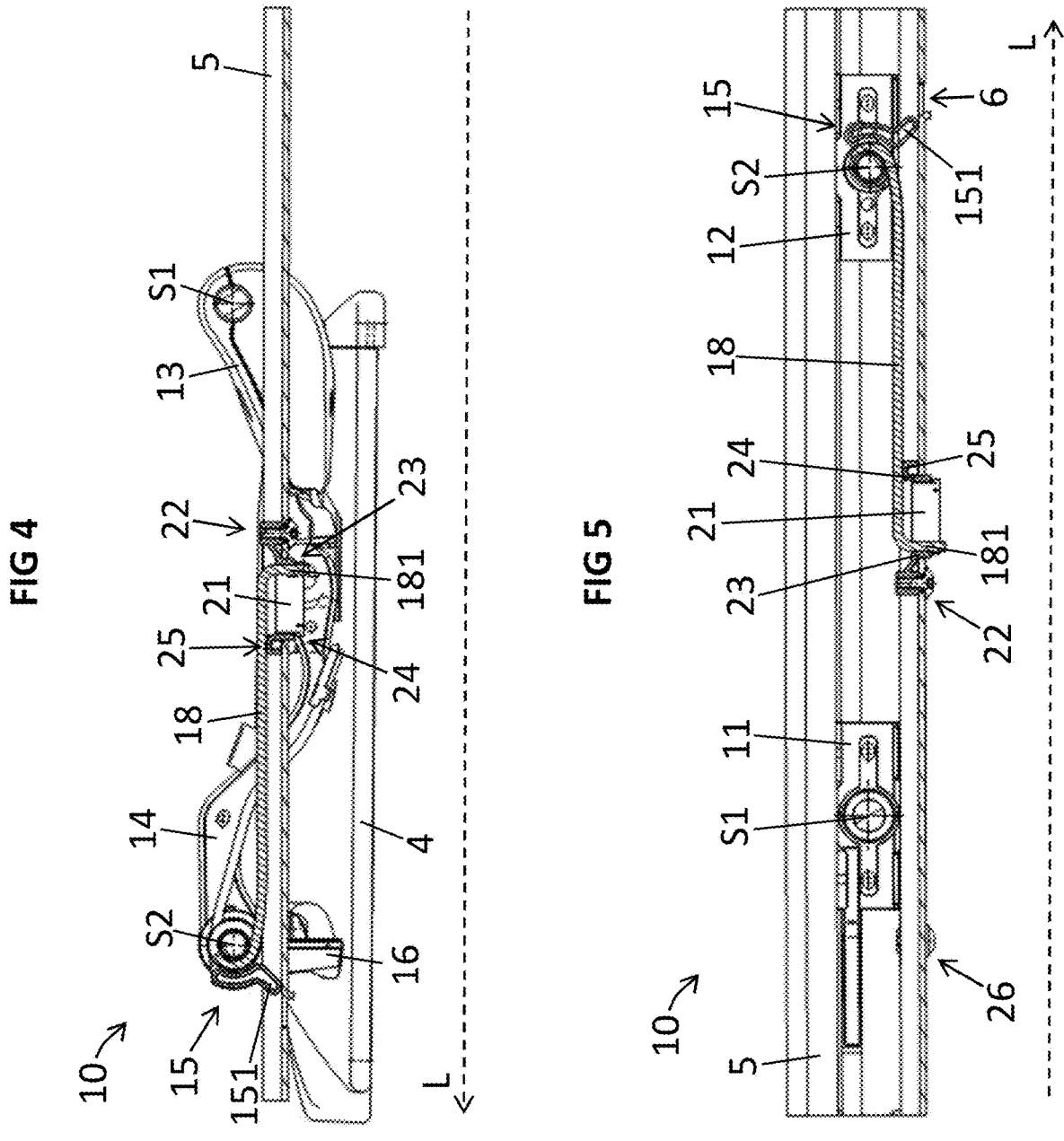
Figure 6:
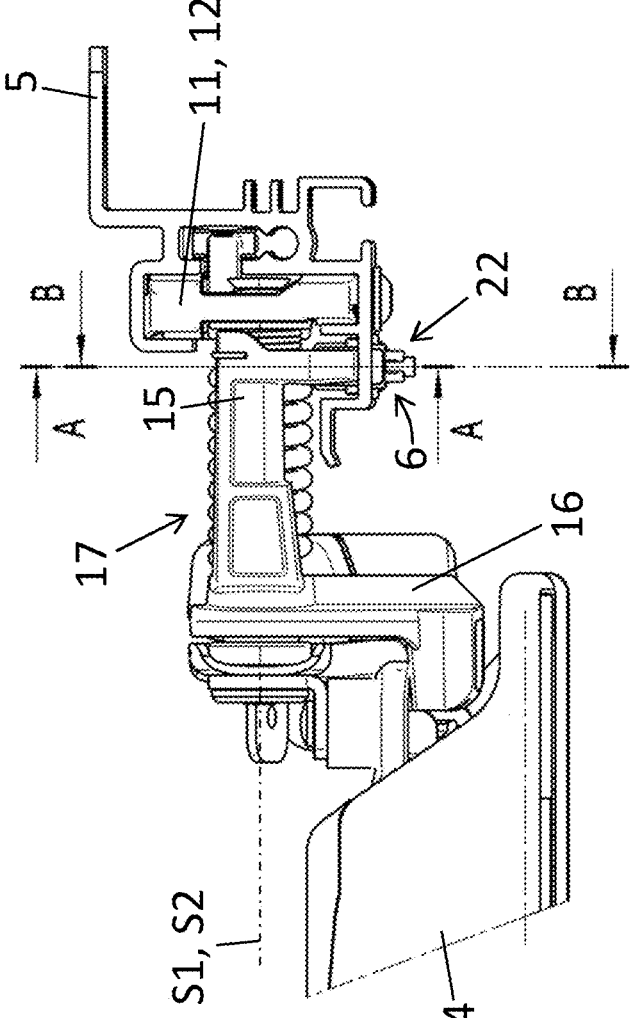

FIGS. 4-6 show the first folded-in and locked state of the display arrangement 4. The locking element 15 and the locking hook 16 lock the display arrangement 4 and the three-point linkage mechanism provided by the pivot levers 13, 14, is effectively rigid. A movement of the driving first guide slider 11 to the rear leads to a synchronous displacement of the second guide slider 12 to the front. The compensating spring element 17 is pretensioned for (over) compensating for the weight force of the screen of the display arrangement 4. The end portion 181 of the first spring arm 18 is in contact with the first end stop 23. Alternatively, the end portion 181 and/or the guide recess 21 can be configured such that the end portion 181 does not come into contact with the first end stop 23 in the first state.

Figures 7, 8:
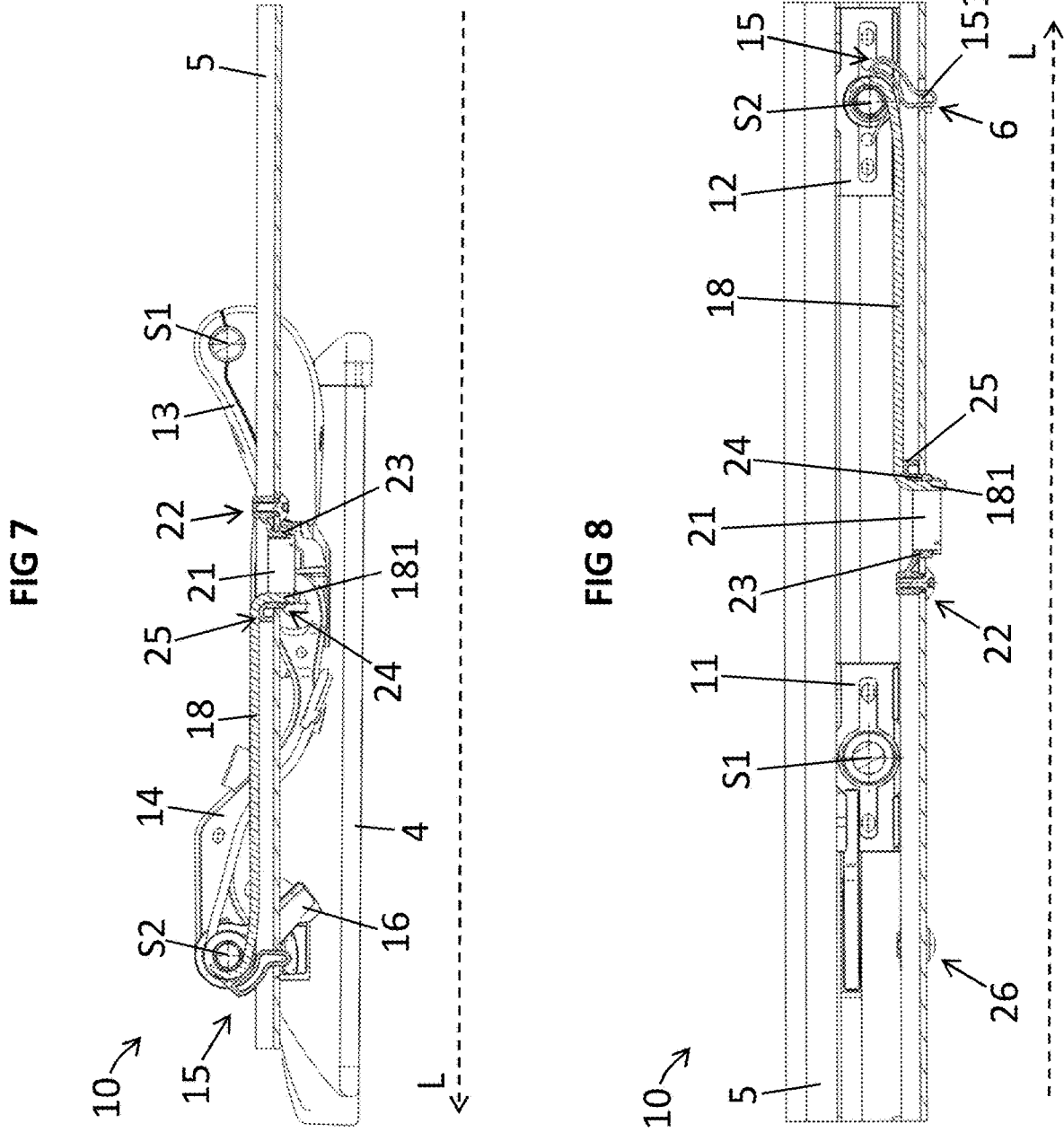
Figure 9:
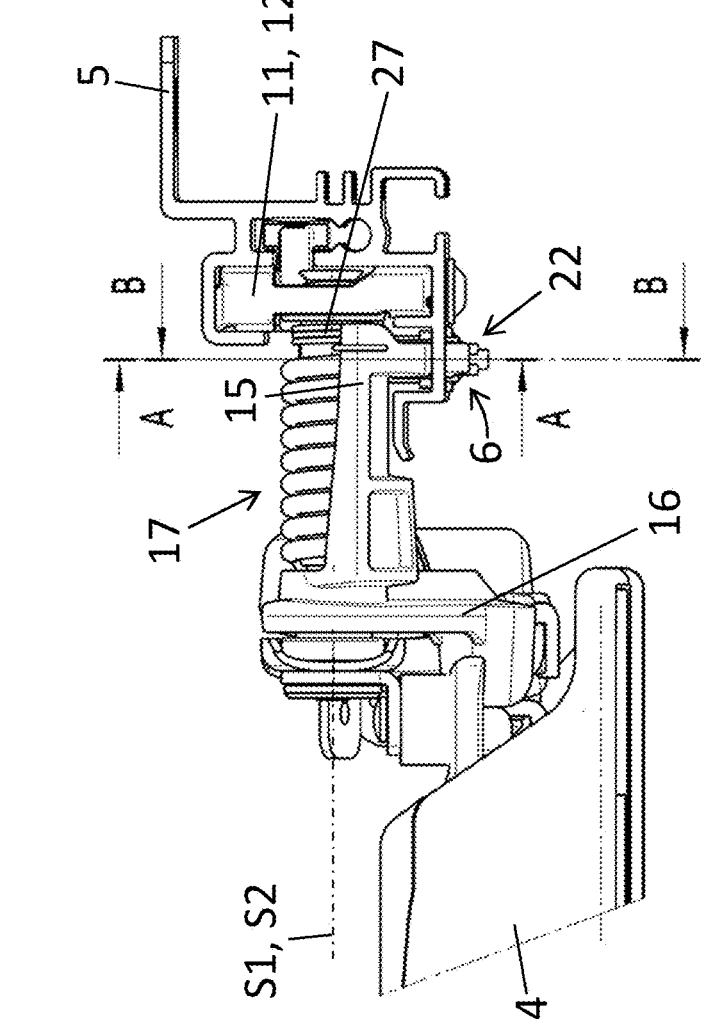

FIGS. 7-9 show the configuration of the second state in which the display arrangement 4 is still folded-in but unlocked and thus released for pivoting open. By means of the first guide slider 11, the spring element 17 is moved by the pivot levers 13, 14 to the front and the end portion 181 is moved away from the first end stop 23 until it contacts the second end stop 24. With this movement to the front, the spring element 17 pushes the second guide slider 12 to the front so that the coaxially mounted locking element 15 is also pushed to the front and downwardly by a leg spring element 27 (see FIGS. 9 and 11) in a pretensioned manner, and the locking arm 151 of the locking element 15 is immersed in a locking receiver 6 which is provided therefor and which is configured at a predetermined position as a recess in the guide rail 5. The locking hook 16 is thus unlocked by an opening moment of the leg spring element 27 and a cut-out or switching contour in the guide rail 5. The second guide slider 12 is now secured in its position and serves as a fixed bearing. The display arrangement 4 is released for pivoting open downwardly into the vehicle interior.

Figures 10, 11:
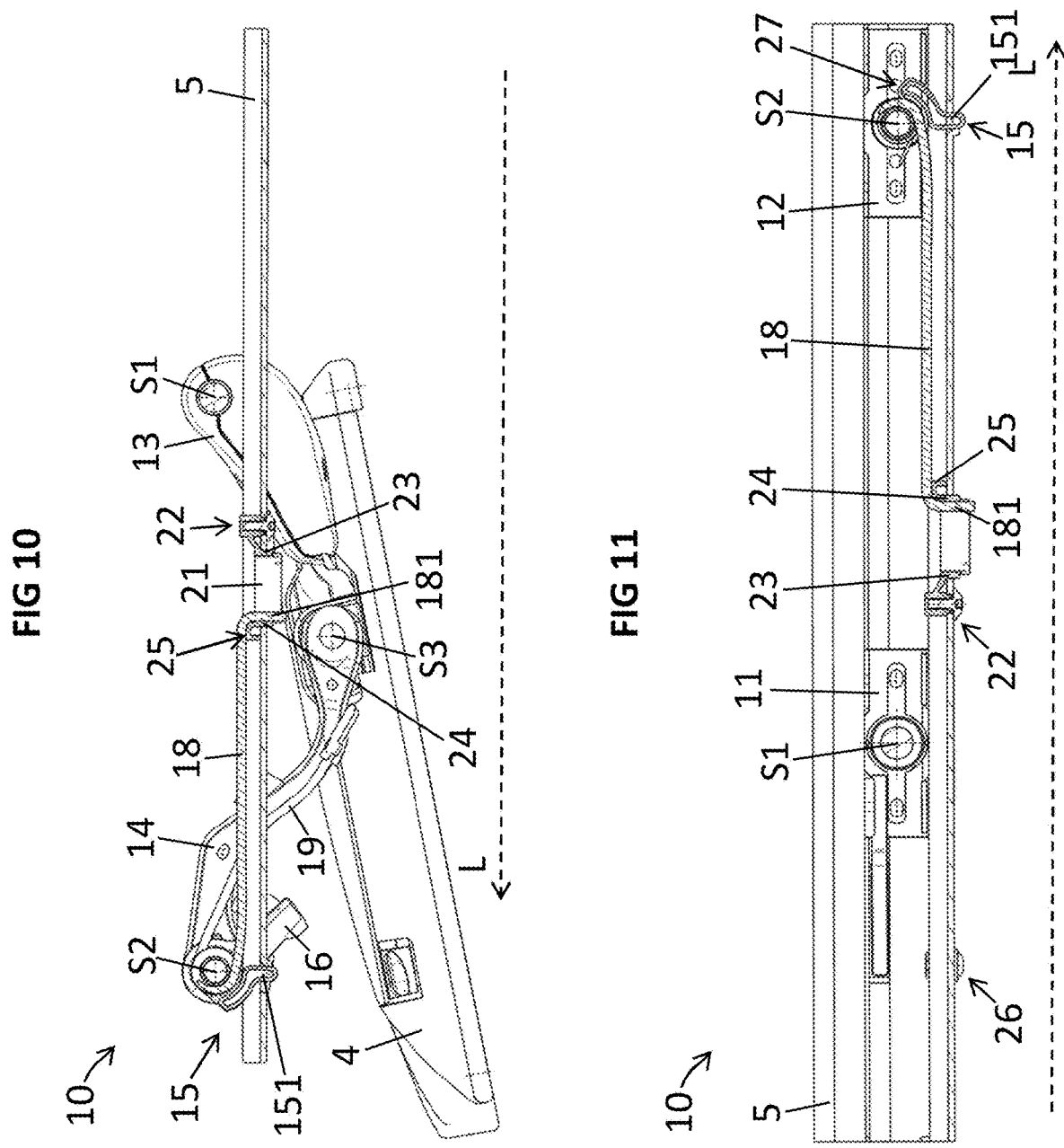
Figure 12:
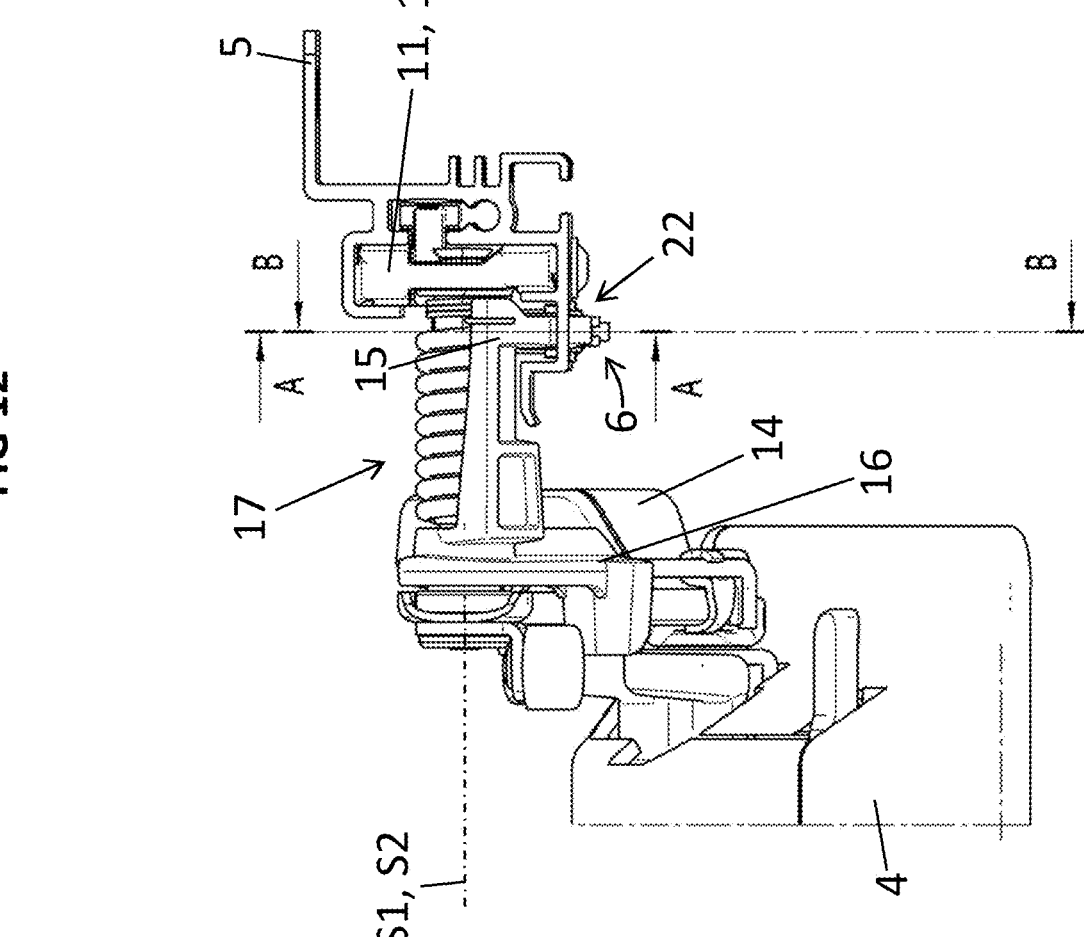

FIGS. 10-12 show a state in which the display arrangement 4 is already slightly folded out.

Figure 13:
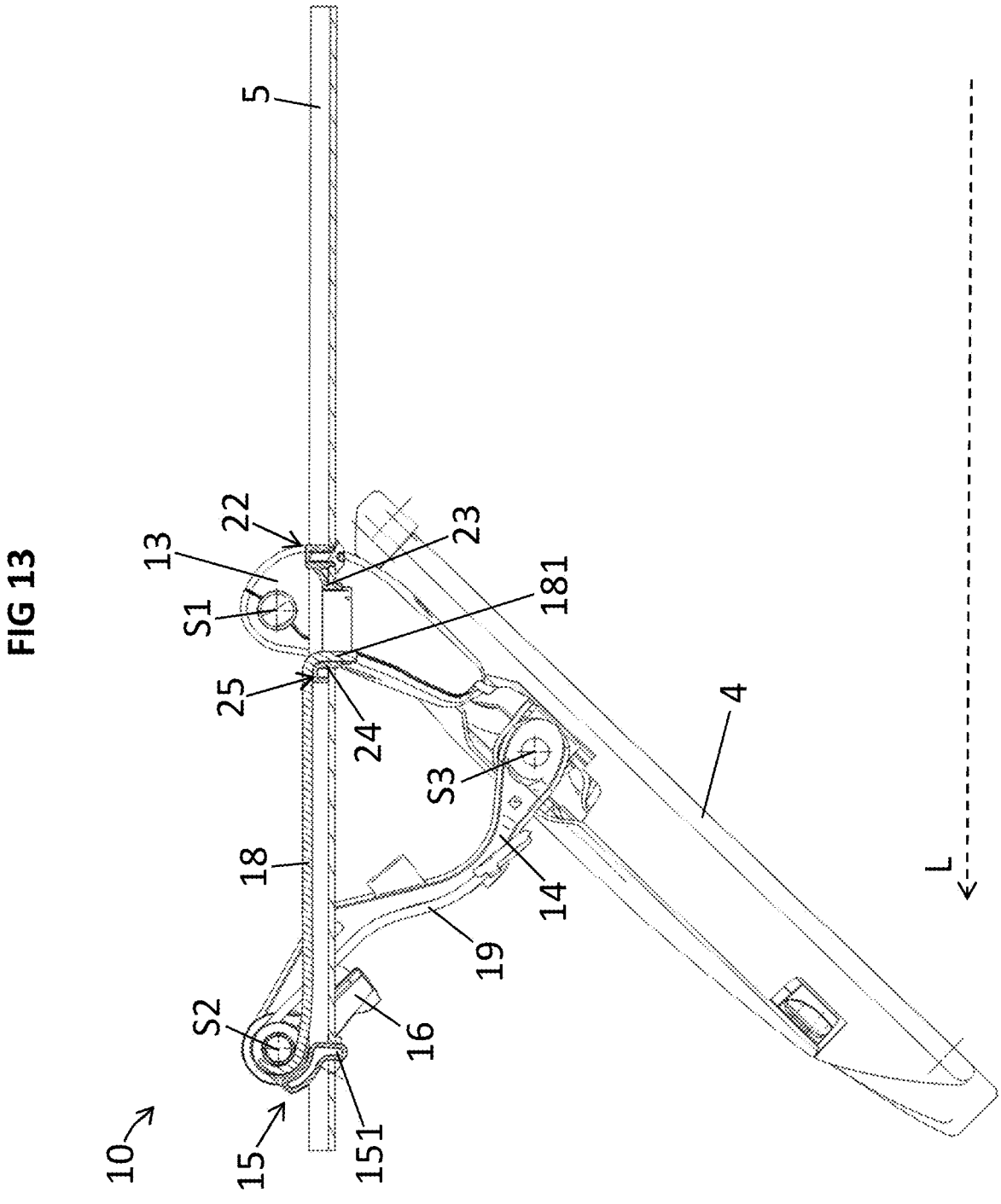
Figure 14:
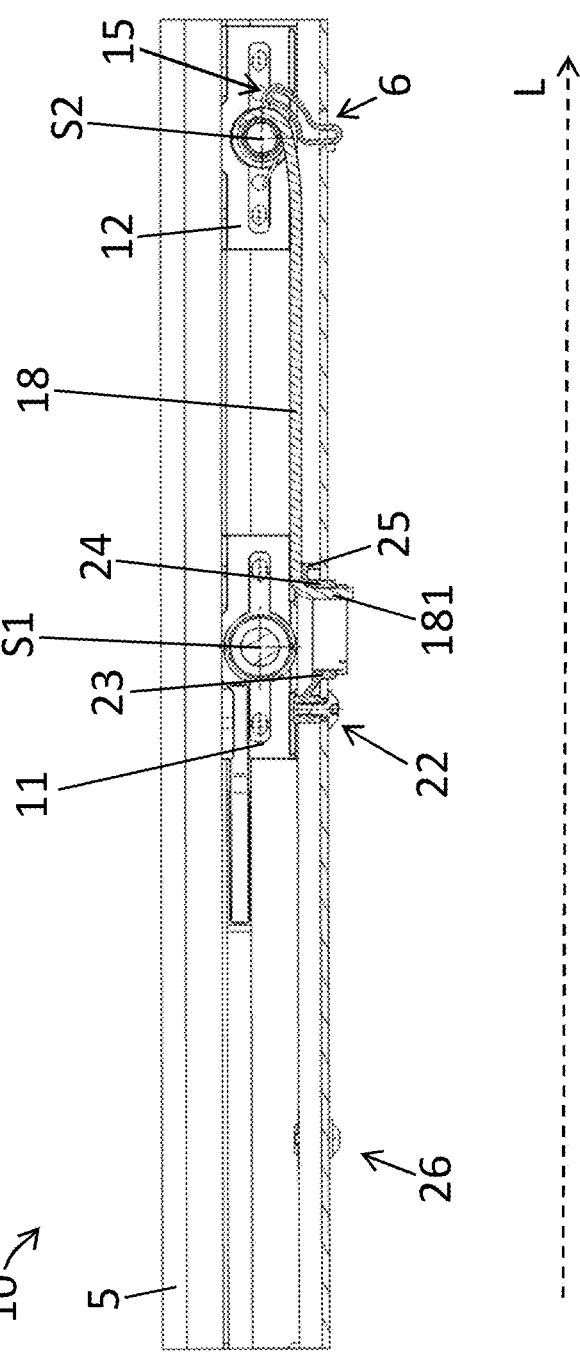
Figure 15:
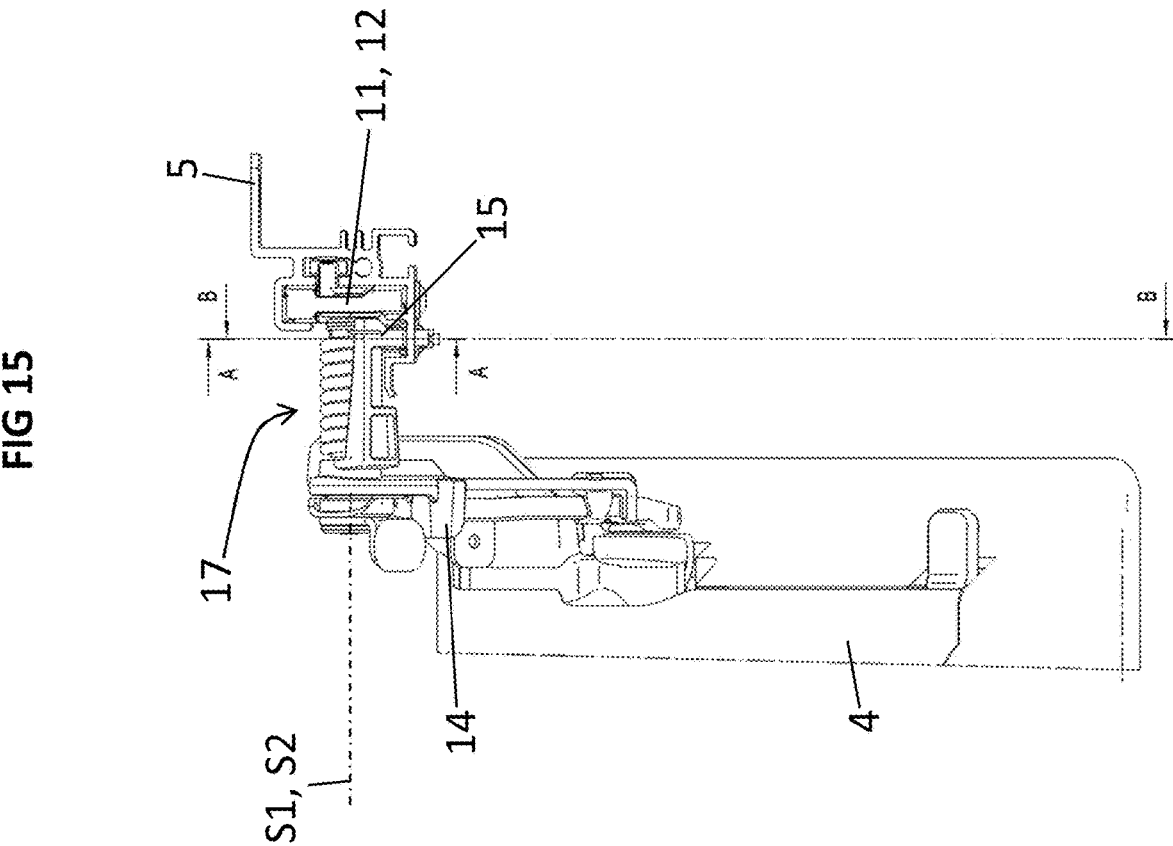

FIGS. 13-15 show a state in which the display arrangement 4 is folded out further in comparison with FIGS. 10-12.

Figure 16:
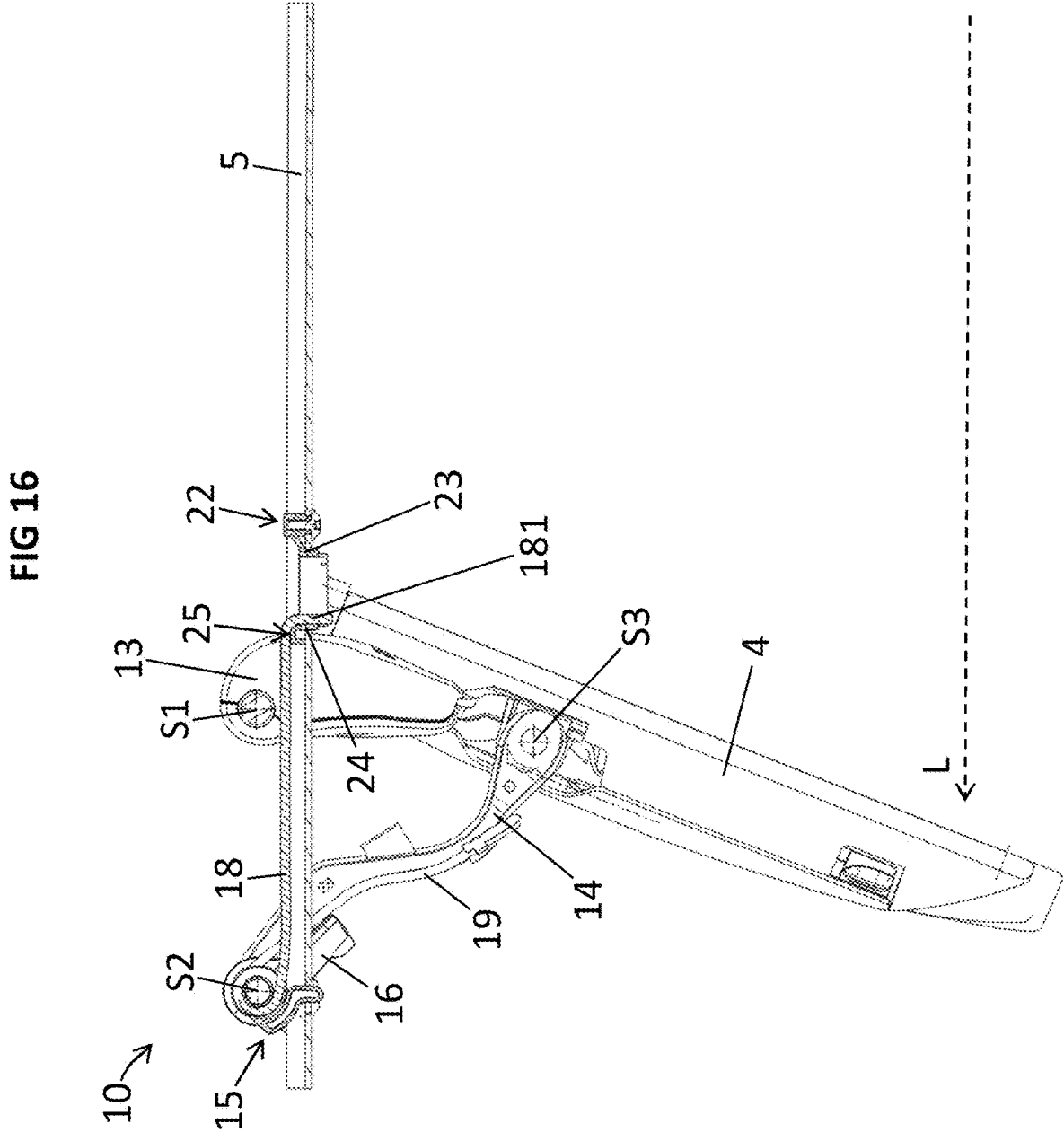
Figure 17:
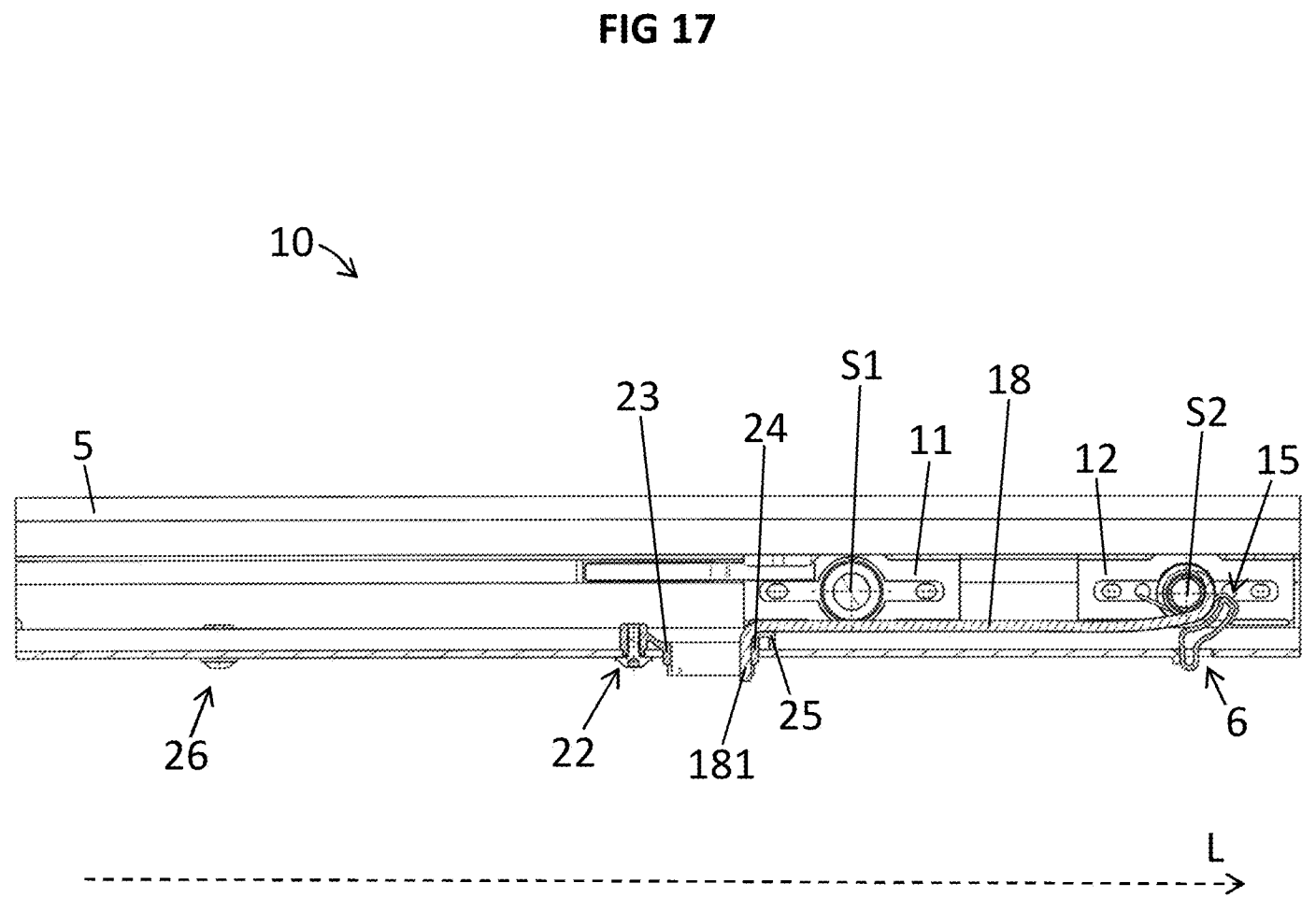
Figure 18:
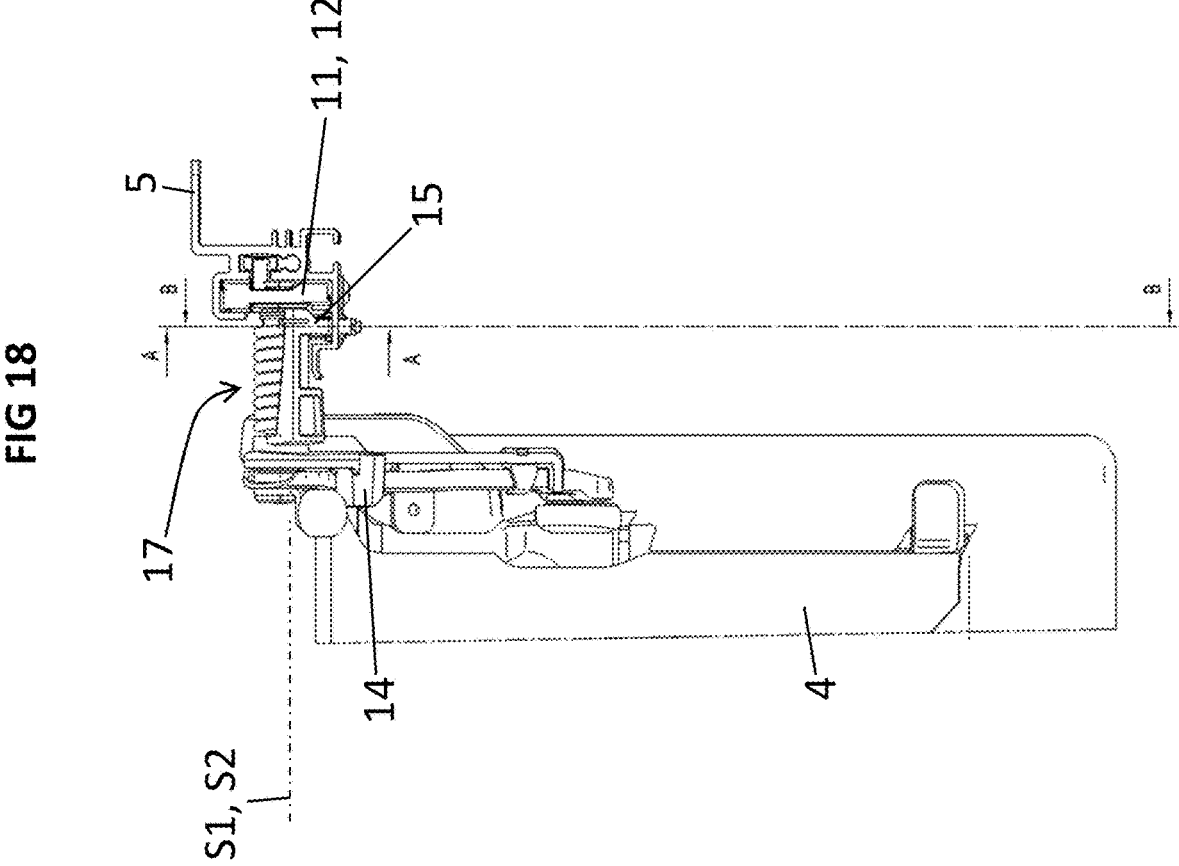

FIGS. 16-18 show the state in which the display arrangement 4 is folded out even further in comparison with FIGS. 13-15.

Figure 19:
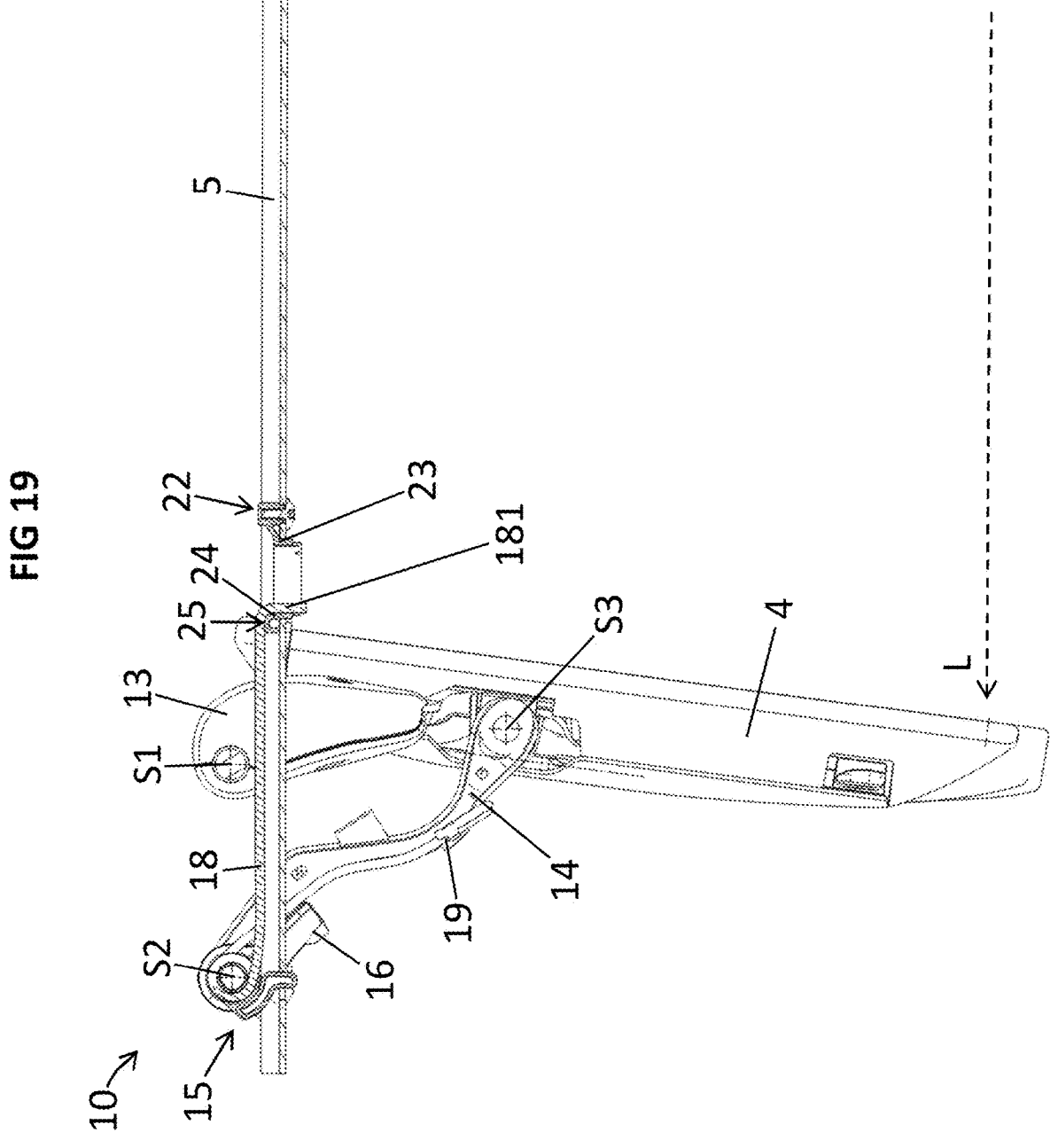
Figure 20:
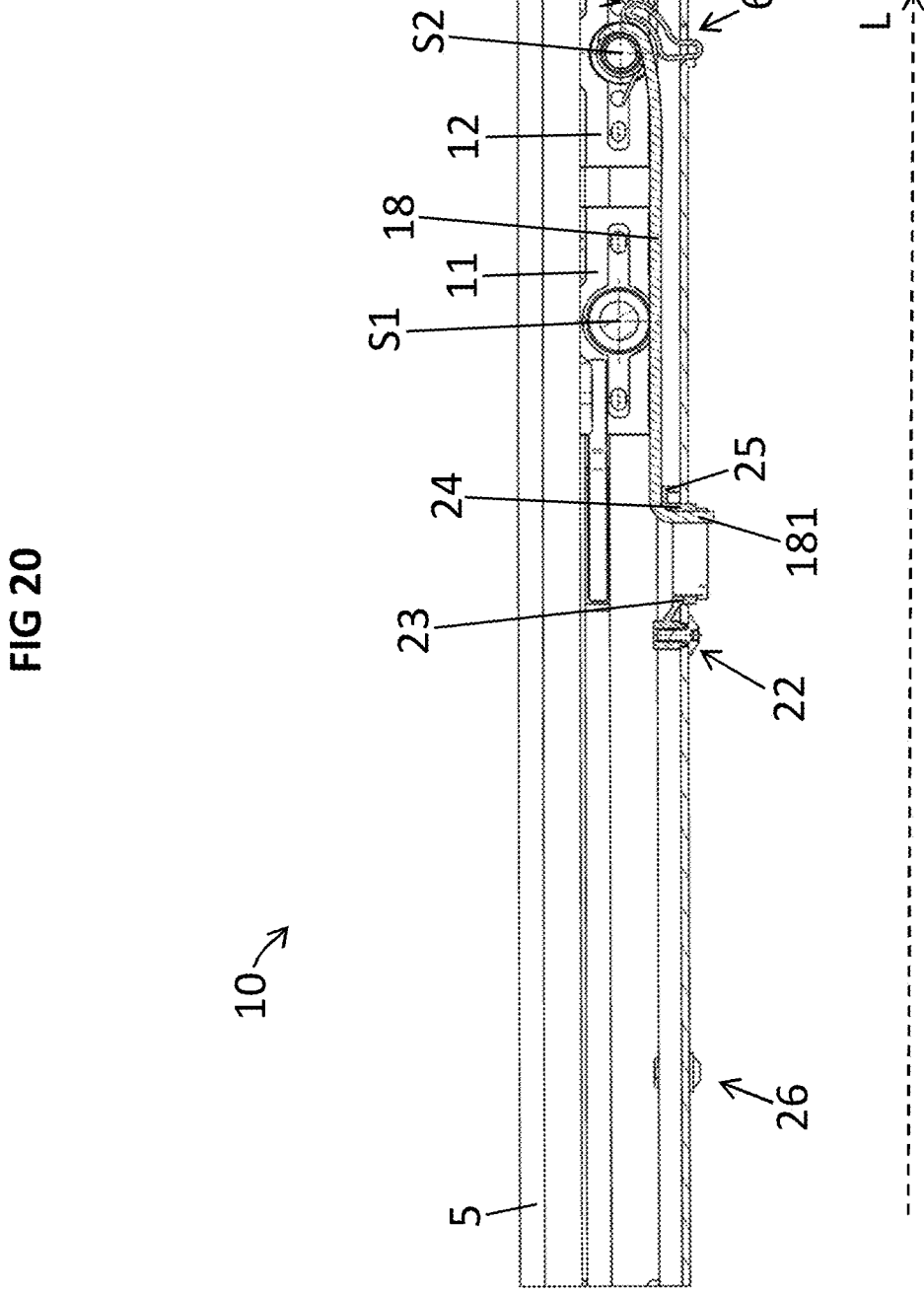
Figure 21:
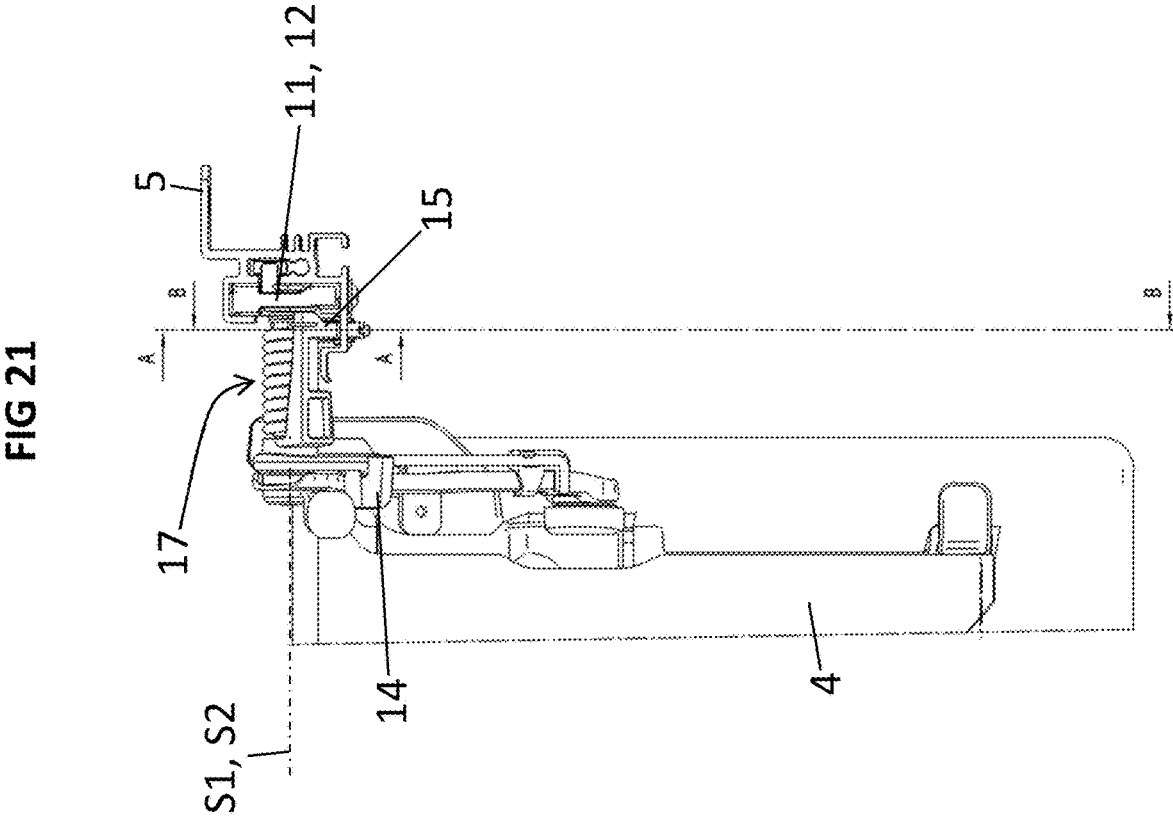

FIGS. 19-21 show, for example, a fully folded-out state of the display arrangement 4 with a desired orientation angle for a pleasant and comfortable operation and/or view. The engagement of the first spring arm 18 on the end stop 24 is preferably secured by a bearing pin in the vertical Z-direction.

A further movement of the drive slide or the first guide slider 11, for example to the rear, is blocked in a predetermined manner by the position of the drive cable and the geared motor of the drive unit. This blocking and the end stops 23, 24 and 26 also serve for securing the display arrangement 4 in the event of a crash, and counteract improper operation of the display arrangement 4 if, for example, it is pulled further to the front or pushed further to the rear.

By means of the described embodiments of the device 10, in each case a mechanism is configured with an electrically adjustable display orientation which provides some advantages in comparison with conventional designs which permit, for example, a pivoting of a display using an actuating motor attached to the rear face of the display. In particular, a space requirement in a vertical direction can be kept small, so that a park position of the display arrangement 4 is not as close to the head circles of the vehicle occupants and a view to the front is not restricted, or less restricted. The device 10 can also be implemented in a cost-effective and space-saving manner with a particularly manageable structure and few components. The device 10 can be actuated, in particular, by means of an electric drive which is fixedly installed simply in the vehicle roof 1. An additional drive and a further drive cable are not required for the second guide slider 12.

LIST OF REFERENCE SIGNS

1 Vehicle roof
2 Roof skin
3 Cover
4 Display arrangement
5 Guide rail

6 Locking receiver
10 Device
11 First guide slider/drive slide
12 Second guide slider
13 First pivot lever
14 Second pivot lever
15 Locking element
151 Locking arm
16 Locking hook
17 Spring element
18 First spring arm
181 End portion of first spring arm
19 Second spring arm
20 Spring guide element
21 Guide portion/recess of spring guide element
22 Fastening element of spring guide element
23 Front end stop of guide portion
24 Rear end stop of guide portion
25 Support element
26 End stop element
27 Leg spring element
L Longitudinal axis/direction of travel
S1 First pivot axis
S2 Second pivot axis
S3 Third pivot axis

The invention claimed is:

1. A device for adjusting a display arrangement for a vehicle roof comprising: a lever mechanism which is coupled to a display holder of the display arrangement and which is configured for pivoting open and pivoting in and for moving the display arrangement, wherein the lever mechanism comprises a first guide slider and a second guide slider which is moveable long a guide rail by means of a drive unit and wherein the lever mechanism also comprises a first pivot lever and a second pivot lever which are coupled to one another so as to be pivotable about one respective pivot axis and to the guide sliders, a spring element which comprises a first spring arm and a second spring arm and which is coupled to the second guide slider and to the second pivot lever, a spring guide element which is fixedly arranged relative to the guide rail and which comprises a guide portion with at least one first end stop, wherein the guide portion is configured to be adapted to an end portion of the first spring arm so that the end portion of the first spring arm engages in the guide portion and is moved inside the guide portion along the guide rail in a predetermined manner and a locking element which is coupled to the second guide slider and is mounted to be rotatable about a pivot axis, wherein the locking element is transferred by means of the first guide slider and the spring element from a first state in which the display arrangement is folded in and locked, into a second state in which the display arrangement is unlocked and is pivoted open or pivoted in, wherein in the unlocked second state the two guide sliders are moved relative to one another and, as a result, a spacing between the two guide sliders is adjusted in a predetermined manner and a pivoting open and pivoting in of the display arrangement is adjusted in a predetermined manner by means of the two pivot levers.

2. The device according to claim 1, wherein the spring element on the first spring arm has a hook-shaped end portion which engages in a guide recess of the spring guide element.

3. The device according to claim 2, wherein the guide recess is defined in a U-shaped manner laterally by the side walls of the spring guide element and on the longitudinal side by the first end stop.

4. The device according to claim 1, wherein the spring guide element comprises a further second end stop so that the two end stops define the guide recess on opposing sides and limit a mobility of the first spring arm along a longitudinal axis of the vehicle roof in a predetermined manner.

5. The device-according to claim 1, wherein the first spring arm contacts the first end stop in the first state of the display arrangement and/or contacts the second end stop in the second state of the display arrangement.

6. The device according to claim 1, wherein the guide recess of the spring guide element is configured to be adapted to the locking element in terms of geometry.

7. The device according to claim 1, wherein the spring guide element comprises a fastening element, the spring guide element being able to be fixedly attached thereby to the guide rail.

8. The device according to claim 1, wherein the spring guide element comprises a support element which supports the first spring arm.

9. The device according to claim 8, wherein the support element is in direct contact with the first spring arm in the region of the end portion.

10. The device according to claim 1, wherein the second spring arm is coupled to the second pivot lever so that it exerts a force on the second pivot lever which drives it in a direction in order to form the first state of the display arrangement.

11. The device according to claim 1, wherein the locking element has a locking arm which is configured to be adapted to a locking receiver so that in the first state the locking arm is arranged outside the locking receiver and in the second state the locking arm is arranged inside the locking receiver.

12. The device according to claim 11, which is configured relative to a ready-for-operation state on the vehicle roof, such that starting from the first state of the display arrangement the locking element with the locking arm is driven by means of the first guide slider and the spring element along a longitudinal axis of the vehicle roof and is moved in the direction of a lower face of the vehicle roof until the locking arm engages in the locking receiver and, as a result, the second state of the display arrangement is formed.

13. The device according to claim 11, comprising: a guide rail, the device being able to be coupled thereby to a roof body of the vehicle roof, wherein the guide rail has an opening which forms the locking receiver.

14. A vehicle roof for a motor vehicle, comprising: guide rails which are arranged relative to a longitudinal axis of the vehicle roof on opposing sides of the vehicle roof and a device for adjusting a display arrangement according to claim 1, which is coupled to the vehicle roof by means of the guide rails.

* * * * *